United States Patent [19]

Baski

[11] Patent Number: 4,531,664
[45] Date of Patent: Jul. 30, 1985

[54] METHOD OF MANUFACTURING A PITLESS ADAPTER

[76] Inventor: Henry A. Baski, 1586 S. Robb Way, Denver, Colo. 80226

[21] Appl. No.: 553,198

[22] Filed: Nov. 18, 1983

Related U.S. Application Data

[60] Division of Ser. No. 317,452, Nov. 2, 1981, Pat. No. 4,416,328, which is a continuation-in-part of Ser. No. 99,831, Dec. 3, 1979, Pat. No. 4,298,065.

[51] Int. Cl.³ ............................................. B23K 31/02
[52] U.S. Cl. ..................................... 228/125; 228/182
[58] Field of Search ............... 228/125, 182, 170, 154, 228/184; 29/157.1 R

[56] References Cited

U.S. PATENT DOCUMENTS

| | | | |
|---|---|---|---|
| 1,525,113 | 2/1925 | Yarnall | 29/157.1 R |
| 3,380,533 | 4/1968 | Andrew | 166/88 |
| 3,519,073 | 7/1970 | Shetler | 166/89 |
| 3,523,350 | 8/1970 | Ferri | 228/125 X |
| 3,525,144 | 8/1970 | Katurich et al. | 228/125 |
| 3,869,108 | 3/1975 | Graham | 29/157.1 R X |

Primary Examiner—Kenneth J. Ramsey
Attorney, Agent, or Firm—Klaas & Law

[57] ABSTRACT

A generally uniform diameter elongated barrel unit secured to the top of a well casing which provides a seat for a spool unit having spaced plates defining a flow directing central space to a lateral distributing pipe. The plates have peripheral sealing means engaging sealing rings of stainless steel material on the inside of the barrel unit. The apparatus may be arranged for use with either a turbine drive type pump having a ground level motor or a submersible pump. The spool unit is inserted into and may be withdrawn from the barrel unit by axial movement. A heavy flange is welded to the top of the barrel unit to provide a heavy duty work platform and motor mount or support for a cover.

3 Claims, 8 Drawing Figures

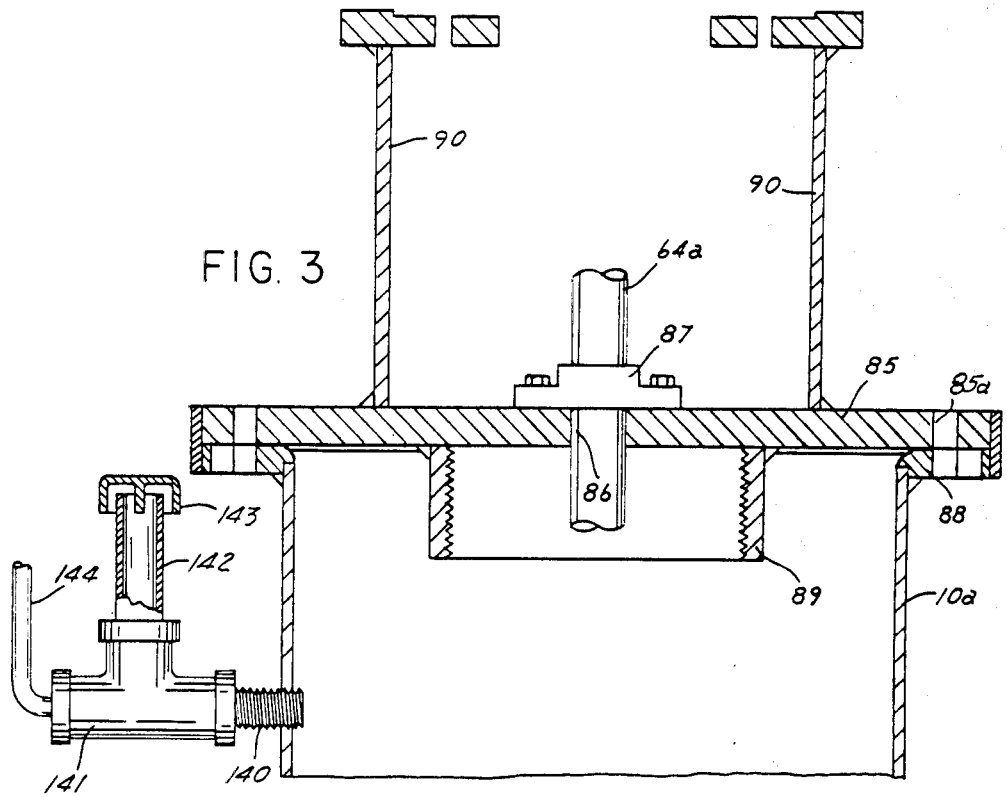
FIG. 3
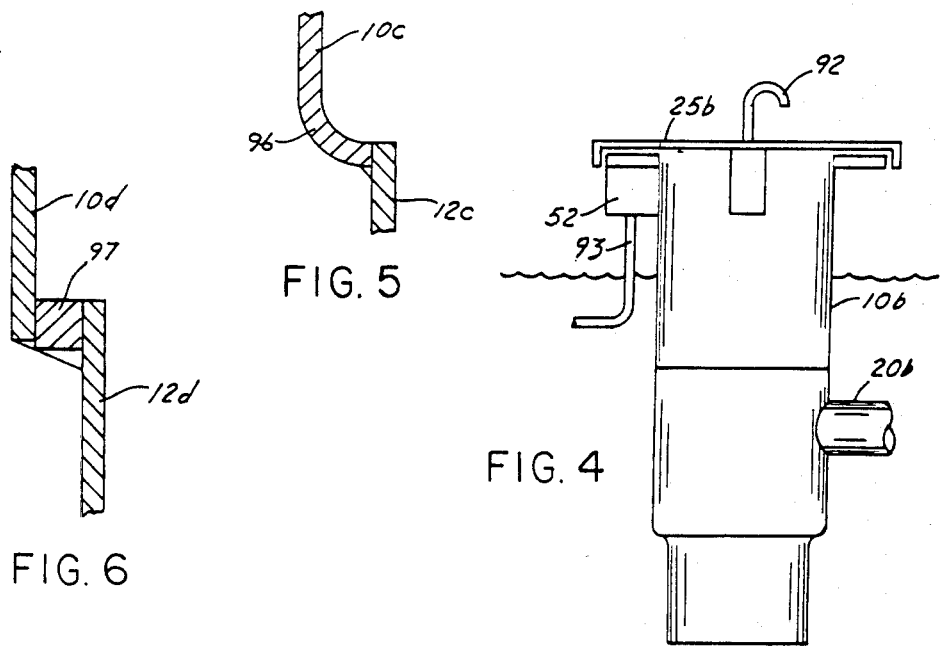
FIG. 5
FIG. 6
FIG. 4

METHOD OF MANUFACTURING A PITLESS ADAPTER

This application is a division of my copending application, Ser. No. 317,452, filed Nov. 2, 1981, now U.S. Pat. No. 4,416,328, which is a continuation-in-part of application Ser. No. 99,831, filed Dec. 3, 1979 and now U.S. Pat. No. 4,298,065.

BACKGROUND & SUMMARY OF INVENTION

This invention relates to pitless adapters and particularly to the removable portion of a well which is mounted between ground level and a well casing, arranged to provide at least one underground distribution line.

In some types of well, the well casing, normally of tubular form, extends vertically from the production zone or zones to near the surface. Lateral distribution from the well is provided by an underground line located a substantial distance below ground level and at least below the frost level for the particular area. In addition to protecting against freezing, such an underground installation also protects the installation against damage, flooding and vandalism. While most present day pitless adapter systems are emloyed with water wells, it is contemplated that the present invention may be employed with any kind of well and, in particular, with oil wells where theft of oil from above-ground lines has become a serious problem. A pitless adapter provides a connecting device between the well casing and the surface, provides seals for the line from the well to the lateral distribution line, and provides the sealed joint for the pump actuator or the pump motor electric lines. In instances of well and pump maintenance, the elements of the pitless adapter must be removed for the withdrawal of the pump or pump-motor assembly.

The well fluid, usually water, is pumped to the distribution point by a pump which may be a turbine-type pump or a submerged pump. In the former, a shaft, rotated by an above ground motor, extends through the pitless adapter, down the production pipe (also called a drop pipe) to a rotary pump. In the submerged type, a totally enclosed motor and close-coupled pump are submerged in the well fluid, and power lines from the surface provide operating power. In either case, the elements extending through the pitless adapter and the head of the casing must be sealed so that pumped liquid is forced out the lateral distribution line and the well will not be contaminated by surface water.

It is, therefore, among the objects and advantages of the invention, to provide a simplified pitless adapter using standard components for major parts of the adapter.

Another object of the invention is to provide a pitless adapter arranged for use for a turbine pump as well as a submerged pump-motor assembly.

Yet another object of the invention is to provide a pitless adapter which is adequately sealed, by stainless steel seals, and which components are easily removed therefrom, having a flange cap for uplift of the components and providing a working surface.

Still another object of the invention is to provide a pitless adapter for large size pipes and casing, usually above about four inches, using standard size steel pipe components.

A further object of the invention is to provide a drop pipe fitting for easy assembly in and out of a pitless adapter.

The foregoing objects and advantages have been obtained by providing an elongated pre-assembled outer barrel unit constructed and arranged for slideable insertion of a preassembled spool unit at the well site in a manner which establishes positive sealing of the well distribution line solely by proper location of the spool unit within the barrel unit. A relatively thin wall (e.g. $\frac{3}{8}$ inch) relatively short length (e.g. 3 to 12 inch) lowermost portion of the barrel unit made of one piece of standard size steel pipe is fixedly attached to an upper end portion of the well casing pipe which has a wall thickness of approximately the same thickness or less than the lowermost portion. A relatively thick wall (e.g. $\frac{1}{2}$ to 1 inch) relatively short length (e.g. 6 to 24 inch) intermediate portion of the barrel unit, made of one piece of standard size steel pipe and fixedly connected to the lowermost portion, is adapted to receive, seal and support the spool unit and provide a lateral fluid discharge connection to a discharge line. A relatively thin wall (e.g. $\frac{3}{8}$ inch) relatively long (e.g. 3 to 12 foot) uppermost portion of the barrel unit, made of one piece of standard size steel pipe and fixedly connected to the intermediate portion, has a relatively thick strong radially extending flange welded at the upper end which is adapted to support a cover plate and sealing gasket for use with a submersible pump or a turbine motor for a turbine driven pump. A pair of vertically axially spaced annular sealing rings made of stainless steel material are fixedly mounted in the intermediate portion. A beveled annular seat is provided on the upper end of the lowermost portion which is located within the intermediate portion in closely downwardly spaced relationship to the lowermost sealing ring. The inner surfaces of the ring members and the seat are machined, and/or ground to provide smooth concentric abutment surfaces. The spool unit comprises a relatively short continuous length central tubular member having a pair of axially spaced parallel annular plate members fixedly attached on the outer periphery thereof. The plate members have smooth concentric annular outer peripheral surfaces of a diameter slightly smaller than the diameter of the annular inner surfaces of the sealing ring members and a vertical axial spacing equal to the vertical axial spacing of the ring members which is slightly greater than the diameter of the lateral discharge pipe connector member. A beveled annular machined seat is provided on the lower edge of the lower plate for abutting supporting engagement with the beveled seat on the upper end of the lowermost portion of the barrel unit. A relatively large size O-ring is mounted in an annular O-ring groove in the outer peripheral surface of each of the plate members. The O-ring members having a normal outside diameter greater than the diameter of the inner surfaces of the ring members so as to be compressed thereagainst when the spool unit is seated on the barrel unit. The upper end of the central tubular member is closed and the lower end is fixedly connected to the pump pipe. The plate members define a fluid chamber connected only to the pump pipe through one or more openings in the central tubular member and to the discharge pipe connection in the side wall of the barrel unit. Passages for downhole electrical cables, air hoses, and the like are provided by tubular members or the like extending axially across the fluid chamber and through the annular plate members.

BRIEF DESCRIPTION OF DRAWING

FIG. 3 is a cross-sectional view of another modified form of pitless adapter for a water lubricated turbine drive type well pump.

FIG. 4 is a cross-sectional view of a cap for a pitless adapter, arranged for a submerged well pump.

FIG. 5 is a cross-sectional detailed view of a portion of a connector for a well casing to a pitless adapter.

FIG. 6 is a cross-sectional detailed view of a modified connector for a well casing.

DETAILED DESCRIPTION

Figure 1:
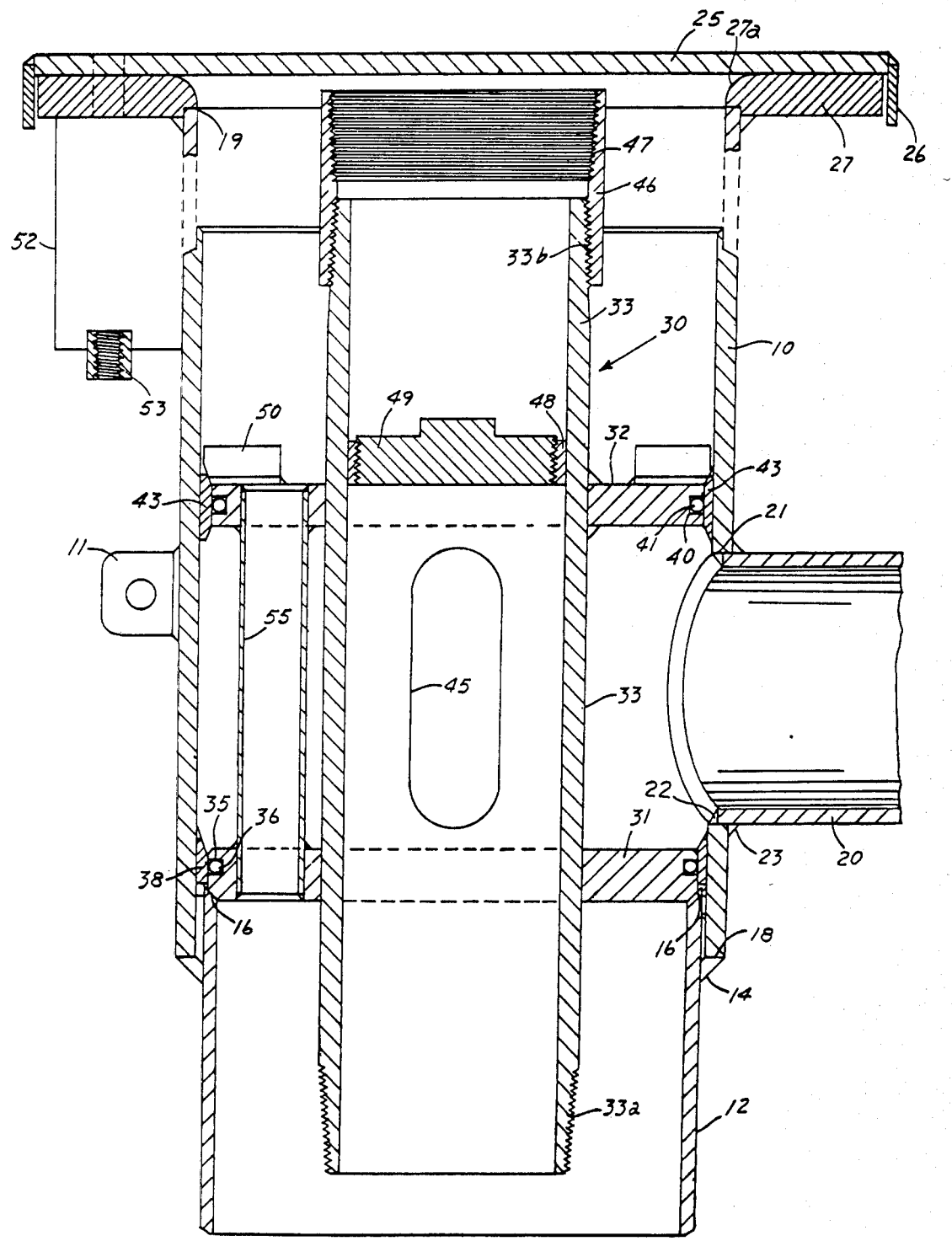
FIG. 1 is a cross-sectional view of one form of pitless adapter, according to the invention, arranged for a submerged pump-motor.
Figure 7:
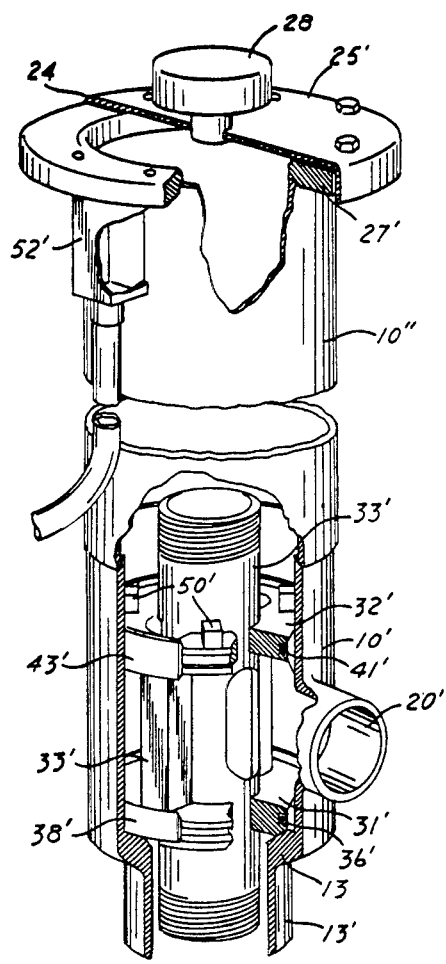
FIG. 7 is a partially cut-away perspective view of a modified pitless adapter for a submerged pump.

In the device of FIG. 1, an outer barrel unit 9 for a pitless adapter comprises a relatively short length relatively thick wall pipe portion 10 made of one piece of standard size steel pipe which is securely fastened to the upper end portion of a relatively short length connector pipe portion 12 made of one piece of standard size steel pipe by a weldment 14. The lower end portion of connector pipe 12 is secured to a well casing, by a weldment, threads, compression fit, etc., not shown. The outside diameter of pipe 12 is smaller than the inside diameter of pipe 10 and a beveled top portion 16 of pipe 12 extends telescopically into and is located above the lower end 18 of the pipe 10. A relatively long length upper pipe portion 19 made of one piece of standard size steel pipe is fixedly connected by welding to the upper end portion of pipe 10. A lateral distribution pipe connector member 20 is secured in hole 21 in the pipe 10 by weldments 22 and 23, forming a waterproof joint as are all other joints. A gasket 24 (FIG. 7) and a cap or cover plate 25, with an outer downwardly directed flange 26 are seated on a relatively thick annular steel plate flange 27 fixedly mounted on the upper end of the pipe 19 by suitable weldments. The cap may include a central breather device 28 such as shown in FIG. 7 or a threaded access hole with a plug as is conventional. A pressure tap may be provided in plate 32, as by a tapped hole and plug (not shown) which is conventional.

The pipe portion 10 is made from a cut to length piece of conventional straight tubular steel pipe having an inside diameter considerably in excess of 4 inches and preferably above 8 inches because the present invention is particularly well suited for relatively large wells (e.g. casing diameters of 8 to 36 inches). The pipe cross-section is essentially an uniform full interior diameter from its top to the top of the connector pipe 12 so as to freely telescopically accept a sealing spool unit 30 therewithin which may be simply entered in or withdrawn by straight up and down axial movements. The spool unit 30 includes annular toroidal plate members 31, 32 which are vertically spacedly secured to a relatively short length continues central conventional size steel pipe member 33, as by welding or the like. The lower plate 31 has a beveled machined end surface arranged to seat on a corresponding beveled machined end surface on the top of the tube 12 and be held thereby. Plate 31 includes a circumferential groove 35 housing an O-ring seal 36 which seals against an annular machined flat inner surface of a stainless steel annular ring 38 secured by welding to the interior of the pipe 10 below and closely adjacent the lateral outlet pipe 20. Plate 32 includes a circumferential groove 40 housing an O-ring seal 41 sealing against an annular machined flat inner surface of a stainless steel ring 43 secured by welding to the interior of the pipe 10 above and closely adjacent the lateral outlet pipe 20. The O-ring members are of relatively large cross-sectional diameter (e.g. ⅜ inch) and made of a suitable resilient compressible material such as Buna-N, nitrile or neoprene. The inner surfaces of ring members 38, 43 and the beveled seat surface on the upper end 16 of pipe portion 12 are concentrically machined during manufacture of the barrel unit after assembly of the components 10, 12, 20, 38 and 43. A port 45, or a series of ports, provides communication to the spool space between the plates 31 and 32 from inside pipe 33 and the spool space also communicates with the lateral outlet pipe 20. The center pipe 33 is provided with threads 33a at the lower end for attachment to the pump drop pipe and threads 33b at the upper end for attachment to a coupling 46 which may also be welded thereto. Coupling 46 includes upper threads 47, into which may be threaded a lifting tool for pulling or setting the drop pipe and spool unit. Suitable plug means, such as a threaded seat 48 is welded on the interior of the center pipe 33 near its upper end, and is closed by a threaded plug 49 to seal the pipe 33 against upward flow of water and to enable access to the bottom portion of pipe 33. Spool bracing and guide means such as a plurality of circumferentially spaced blocks 50 or an annular ring may be welded on the top of plate 32 for stability of the spool while being moved in and out of pipes 10 and 19 by engagement with the inner surfaces of pipes 10, 19. In the preferred embodiment, four equally circumferentially spaced blocks 50 are welded on the upper surface of plate 32 so as to extend radially outwardly beyond plate members 31, 32 and O-rings 36, 41 to prevent contact with the inner surfaces of pipes 10, 19 during movement to and from the assembled position. The upper and lower edges of ring 43 and the upper edge of ring 31 are beveled to enable the O-rings to move thereacross without damage. The lower edges of blocks 50 are beveled as indicated at 51 to clear ring 43 in the seated position.

For a submerged pump, a power line entrance box 52, with a threaded inlet 53, directed downwardly, provides means for bringing the power line into the adapter through an opening 54, FIG. 7, cut in pipe portion 19. Enclosed vertically extending access passage means 55 extend between and through plates 31, 32 to receive electric lines, air lines, control lines, monitor lines, fluid treatment lines, etc. Passage means 55 may be in the form of a tubular member as shown in FIG. 1 or an U-shape channel member 35 welded to the outer surface of pipe 33' as shown in FIG. 7. The tubular members, FIG. 1, are welded in aligned openings in the two plates of the spool. This opening permits any water which accidently gets in top of the adapter to flow back into the well unless the inlet opening is sealed such as by a sealing compound or mechanical compression seal around the lines which is required in a flowing well. Sealing gasket 24 normally prevents entry of ground water into the barrel unit. A lifting lug (or a series of circumferential lifting lugs) may be secured to the cap to provide easy handling of the adapter pipe for installation, etc.

A modified pitless adapter, FIG. 7, for submersible pumps includes a heavy wall intermediate housing pipe 10' with a welded-on side discharge connector 20', which may be threaded, flanged, welded, compression fitted or the like to a lateral water line. The housing includes a beveled shoulder 13 on the upper end of lower connector pipe 13' which is welded to a well casing. A relatively thin, e.g. ⅛ to ⅜ inch, upper stainless steel ring 43' and a relatively thin, e.g. ⅛ to ⅜ inch, lower stainless steel ring 38' are welded in the housing pipe 10' to mate with O-rings 41' and 36', respectively. The O-rings are mounted in the periphery of spool flanges 32' and 31', respectively, mounted on spool tube 33' which is threaded on upper and lower ends as in FIG. 1. An upper housing pipe 10" of suitable length to enable the spool to be positioned at the correct depth underground, is welded to housing pipe 10'. A flange 27' on the top of the casing 10" supports a cover 25' with a flat, annular gasket 24 for sealing. An air vent 28, centrally located, communicates through the cover with the chamber of the housing. An electrical junction box 52' provides electric service to the adapter through opening 54. Four centering blocks 50' stabilize the spool and prevent damage to the O-ring during insertion or removal of the spool.

Figure 2:
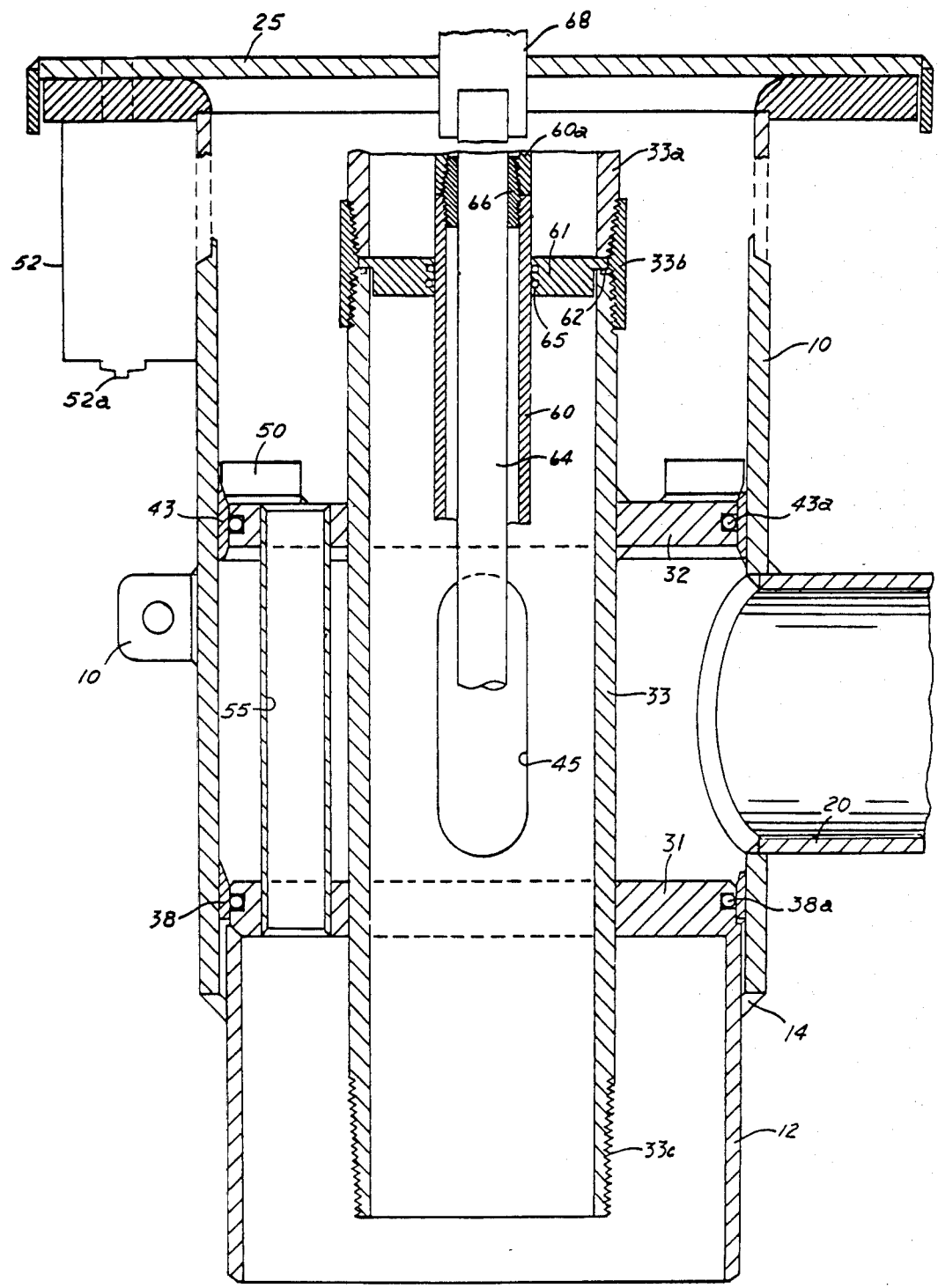
FIG. 2 is a cross-sectional view of the adapter of FIG. 1, modified for an oil lubricated turbine drive type well pump.

The adapter of FIG. 1 may be modified to utilize an enclosed shaft-type turbine pump as shown in FIG. 2 wherein plug 49 and ring 48 are replaced by shaft bearing means, in the form of a sleeve bearing 66 threaded to the top of inner column pipe 60, for rotatably supporting and housing a pump shaft 64. Bearing sleeve 66 is also threaded to outer support tube 60a secured by an anchor (not shown) on plate 25. The upper end of shaft 64 is directly connected to the motor or a drive coupling as illustrated at 68. Shaft 64 is rotatably mounted in stationary closed tube 60 which is sealed by O-rings 65 in plate 61 secured on the top of tube 33 by coupling 33b and sealed by O-ring 62. An upper extension tube 33a is secured in coupling 33b and may have a threaded upper end portion (not shown) for engagement with a threaded member 89 (FIG. 3). Tube 33 is threaded at 33c for connection to the well drop pipe. The coupling 68 is normally connected to the shaft of an electric motor (not shown) mounted on the plate 25. In this manner, the entire spool unit including the sealing plate 61 can be pulled off the inner column 60 without disassembly. The shaft, of course, extends down the drop pipe to the rotary pump and is normally oil lubricated by dripping oil down the shaft 64, through bearing 66. Electric inlet box 52 with power line connector 52a are not normally used for a turbine pump, but are shown to illustrate the versatility of the unit for adaption to either type of pump.

Figure 8:
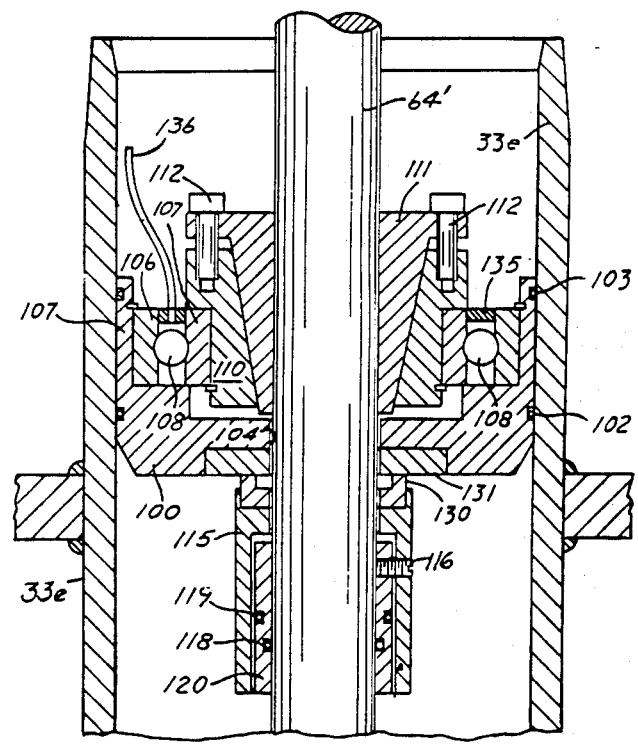
FIG. 8 is a cross-sectional view of shaft seal and bearing set of a water lubricated turbine pump shaft, adapted to a pitless adapter according to the invention.

A modified seal and bearing arrangement for an open shaft-type turbine pump is shown in FIG. 8, where a spool tube 33e has a cup-shaped bearing mount 100, sealed and non-rotatably frictionally supported by O-rings 102 and 103 relative to the inside of the tube, with a bore 104 for a drive shaft 64'. A rotary bearing means, including outer race 106 and inner race 107 support ball bearings 108 for free rotation of the inner race 107 relative to outer race 106. The inner race 107 is secured to a collar 110 which is fixedly mounted on a tapered conical lock collar 111 frictionally secured in position on the shaft and bolted by bolts 112 to the collar 110 so that the collars 110, 111 rotate with the shaft 64' on the bearing means. A conventional rotating mechanical seal unit, such as sold by Crane Company, is separately mounted below bearing mount 100. It includes an extension tube 115, frictionally secured to the shaft 64' to provide for static sealing of the sleeve 120, sleeve 115 and shaft 64' which rotate together. Tube 115 is secured by set screw 116 to tube 120, and O-rings 118 and 119 provide a seal between the shaft and sleeve 120, and between sleeve 120 and sleeve 115, respectively. The dynamic seal is provided by a ring seal 130 against stationary seat 131. The ring seal 130 is frictionally held in tube 115. A grease line 136 extends from the cap 25 through seal 135 to the space in the bearing set to provide greasing from outside the unit. The advantages of this seal and bearing arrangement are: (1) it is leakproof; (2) it has an antifriction bearing for shaft centering to eliminate vibration problems; (3) the whole assembly can move up and down to enable required vertical shaft adjustment; (4) after loosening bolts 112 and removal of cone 111, the spool assembly can be lifted off the shaft for disassembly; (5) ball bearings can be lubricated from above to eliminate wear without contamination of the well. It will be understood that downhole bearings are lubricated by the fluid being pumped up the drop pipe.

For turbine pumps, an electric motor may be mounted on the cap plate of a pitless adapter, and one method is shown in FIG. 3, wherein a cap 85 is provided with a central bore 86 covered by a sealing bearing journal 87 holding a drive shaft 64a. The cap seats on holed flange 88 welded to the top of pipe 10a and is provided with bolt holes 85a for attachment to the flange or receipt of threaded eye bolts or the like providing lifting means. A threaded center pipe support 89 is welded to the inside of the cap. A motor mount 90 is welded to the top of the cap, and it is arranged to have a motor bolted to it. A close nipple 140 may be secured in the side of the tube 10a and tee 141 secured thereto. A standpipe 142 with a breather cap 143 is mounted on the standpipe. An air hose 144 may be secured to the remaining opening of the tee. The construction of the rest of the pitless adapter unit may be the same as previously described. Thus, turbine pump type apparatus of FIGS. 2, 3 & 8 may employ many of the same components as the submersible pump apparatus of FIGS. 1 and 7. Thus, the basic components, such as barrel unit 9, may be carried as stock or inventory items for use with both types of pumps.

One of the important aspects of the invention is the thick flange 27, FIG. 1, welded to the top of the pipe 10. This flange provides the large radius, curved corner 27a which prevents chafing and scraping of electric cables, etc. passed through the opening beneath cover 25 during installation and removal of the spool unit, drop pipe and pump. A most common cause of pump malfunction is the failure of the electrical cables which are of relatively large size, e.g. ½ to 1½ inch diameter. Such cables are stored on reels and are unreeled to be pulled downhole as the drop pipe is lowered into the hole.

The flange 27 also provides a solid seat for the cover plate 25 and the bolts holding the cover. In many installations, the well line is held down by the cover. This is important in shallow wells where the water pressure from the pump causes the well line to jump up and down due to pressure changes at the sealed spool during flowing conditions of the water. Additionally, the flange provides a sufficiently strong base for the cover plate 25 which acts as a platform for the heavy motors for turbine pumps, FIG. 3. It is noted that the thickness of the cover plate may be changed to meet the demands of the system. When heavier motors are needed, the cover plate may be made thicker to accommodate the weight. In pulling the well pipe, substantial forces are applied to the top of the pipe as the pulling mechanism is best braced on the top of pipe 10. Various pipe holding mechanisms as spiders, tongs, wrenches, clamps, slips, etc. may be used to hold the pipe, while seated on the flange whereas in the prior art such devices are supported on a temporary platform having independent supports mounted around the outer pipe of the pitless adapter, and the pitless pipe does not support such devices during installation and removal of the pump and drop pipe. Thus there is substantial stress on the top of the pipe as the well line (and pump) may weigh many tons.

The flange 27 welded to the pipe provides a sturdy and strong support for the various activities requiring a work surface. The flange with a shoulder seated on the edge of the pipe 19 and being welded to the pipe, strengthens the pipe, particularly at the pipe mouth so that it is capable of withstanding substantial forces. The work platform provided takes the place of the many temporary supports used in prior art pitless adapters. The flange of the present invention will support a heavy cover plate which is the platform for the motor mounts, FIG. 3. The flange is annular with an opening the size of the opening of the outer pipe and is preferably substantially thicker than the outer pipe of the pitless adapter, preferably, approximately 1½ to 4 times the thickness of the pipe wall. This provides for the smooth, outwardly curving long radius curve at the pipe opening, and provides the strength needed for the stresses to which it is subjected. The flange extends outwardly from the pipe at from 1 to 8 inches, providing adequate support for bolts and the cover. The bolt holes in the flange 85 may be used to mount eye bolts or other devices for lifting and placement of the barrel unit during connection to the well casing.

Schematically shown in FIG. 4, is a pitless adapter 10b with a lateral distribution pipe 20b. A cover 25b is provided with a breather 92 having a downwardly pointing opening discouraging weather moisture entrance. A power service entrance line 93 is connected to the entrance box 52 from the bottom.

The outer intermediate pipe 10, FIG. 1, of the adapter may be connected in several ways to the lower connecting pipe 12 which is attached to the well casing. As shown in FIG. 5 an outer tube 10c of the pitless adapter has an inwardly, directed rounded shoulder 96 which is welded to the top of a bottom tube 12c. After the welding operation, an inclined spool seat is machined across the welded joint. When there is a substantial difference between the inside diameter of a standard sized intermediate pipe 10 and the outside diameter of a standard size lower pipe 12, the lower straight intermediate pipe section 10d, FIG. 6, may be welded to a spacer ring 97 which is welded to the top of the bottom pipe 12d. This, after machining, also provides a tapered spool seat. The bottom pipe is connected to the well casing as explained above.

The arrangement of the pitless adapter is such as to enable manufacture of components which may be stored as an "off the shelf" item. For example, the intermediate pipe 10, lower pipe 12 and lateral pipe 20 can be manufactured and sold as a sub-assembly. Thus, a user can cut a standard size steel pipe to a desired length to provide the upper pipe portion 19 which can be welded onto the intermediate pipe portion by the user. In addition, the cover 25, flange 27 and spool assembly 30 can be separately supplied. The sealing rings may be made of stainless steel which are not easily damaged, and insure positive long life for the "O-rings". The unit is best adapted to larger sizes of casing, from 6 to 36 inches. Since it is made from essentially stock items, it provides an inexpensive adapter, which is simply installed, easily maintained by substituting parts.

In use of the pitless adapter apparatus, a hole of substantial depth, e.g. 3 to 12 feet, is dug in the ground around the well casing to a depth sufficient to be below the frost line in cold climates and to protect the lateral discharge line against other damage or vandalism. The top end of the well casing pipe is cut off at a depth such as to enable installation of the pitless adapter apparatus at the desired depth. Then, a pre-assembled upper casing barrel unit, of appropriate size and length, including pipe 10, connector 12, discharge pipe 20, flange 27, and stainless steel sealing ring members 38, 43, is fixedly mounted on the upper end of the casing pipe such as by welding the lower end of connector 12 thereto.

The preferred method of construction of the casing barrel unit is as follows: intermediate pipe 10 and connector pipe 12 are cut to size and shape from standard size pipe stock; stainless steel sealing rings 38, 43 are fixedly mounted in pipe 10; opening 21 is cut in the side wall of pipe 10 and discharge pipe connector 20 is welded in opening 21; pipe 10 and connector 12 are welded together in telescopic relationship; and the inner surfaces of stainless bearing rings 38, 43 and seat 16 are machined to provide concentric precision surfaces. In the manner, a standard subassembly is provided for attachment of a standard size upper pipe portion 19 of suitable length at the factory or in the field by the end user. Flange 27 is welded to connector pipe 19 and connector pipe 19 is welded to pipe 10.

After the casing barrel unit has been mounted on the upper end of the well casing pipe, the lateral discharge pipe 20 is connected to the discharge pipe line and the ground hole is backfilled to cover the discharge pipe and the barrel unit. A pump attached to a drop pipe string is lowered into the well casing pipe through the casing barrel unit. A spool unit 30 of suitable design is fixedly mounted on the upper end of the drop pipe string at ground level above the upper end of connector pipe 19 and flange 27 by threadably inserting threaded lower end portions 33a into a female coupling member. A tool is threaded into coupling 46 to hold the drop pipe and spool unit. The electrical cable for a submersible pump installation is threaded through cable tube 55 is pre-assembled spool unit 30 which is then telescopically inserted into the casing barrel unit after a suitable lubricant such as a silicon grease has been applied to the O-rings 36, 41 to prevent damage to the O-rings during assembly. Blocks 50, which extend radially outwardly beyond the O-rings, also prevent damage to the O-rings during assembly by preventing engagement of the O-rings with the inner surfaces of the barrel unit pipes 10 and 19. The drop pipe and spool unit are lowered into the barrel unit until the lower beveled edge of the plate member 31 seats on the beveled edge 16 of connector pipe 12 which precisely locates O-rings 36, 41 opposite the precision ground annular surfaces on stainless ring member 38, 43. During assembly, the O-rings first engage the beveled upper edge surfaces of ring member 38, 43 which causes the O-rings to be gradually compressed. The bottom edge surface of ring member 43 is also beveled to prevent damage to the bottom O-ring 36 during assembly. In the assembled position, the O-rings are compressibly seated in grooves 35, 40 and on the flat annular inner surfaces of ring members 38, 43 to provide a permanent seal which is not subject to wear and tear caused by any relative movement of parts and which is protected against corrosive damage due to contact with water.

After the spool unit has been inserted in the barrel unit, the support tool is threadably disengaged from coupling 47 and may be removed from the barrel unit. The electrical cable is connected to a power source through junction box 52 and hole 54. Gasket 24 and a cover plate 25 of suitable design are fastened to flange 27 to seal the opening at the top of the barrel unit. Rim portion 26 extends downwardly around flange 26 to cause moisture to flow downwardly beyond the cover-flange joint. Junction box 52 is located beneath flange 27 and inwardly of rim 26 so as to be protected thereby.

While the foregoing illustrative and alternative embodiments of the invention are specifically directed to water well usages, it is to be understood that the invention is applicable to other kinds of wells such as oil wells. Thus, it is intended that the appended claims be construed to include alternative structure and alternative uses except insofar as limited by the prior art.

The invention claimed is:

1. The method of manufacture and assembly of an outer barrel unit of pitless adapter apparatus comprising the steps of:

cutting a length of standard relatively small diameter steel pipe to provide a predetermined length lower portion of the barrel unit adapted to be connected to a well casing;

cutting a length of standard relatively large diameter steel pipe to provide a predetermined length intermediate portion of the barrel unit;

cutting a discharge opening in the wall of the intermediate portion;

welding a connector member in the discharge opening;

fixedly mounting vertically axially spaced spool sealing ring members inside the intermediate portion on opposite sides of the discharge opening;

telescopically inserting the upper end of the lower portion into the lower end of the intermediate portion a predetermined distance to provide an overlapping joint therebetween;

welding the lower portion to the intermediate portion across the joint therebetween; and machining the sealing ring members and the welded joint to provide concentric sealing surfaces on the sealing ring members and a beveled spool seating surface across the welded joint.

2. The invention as defined in claim 1 and further comprising:

cutting a length of standard relatively large diameter pipe to provide a predetermined length upper end portion of the barrel unit; and welding the lower end of the upper end portion to the upper end of the intermediate portion.

3. The invention as defined in claim 2 and further comprising:

welding an annular flange portion to the upper end of the upper portion.

* * * * *